United States Patent
Gelfer et al.

(10) Patent No.: US 10,208,178 B2
(45) Date of Patent: Feb. 19, 2019

(54) SYNTACTIC POLYURETHANE ELASTOMERS HAVING DISTINCT MORPHOLOGY FOR USE IN SUBSEA PIPELINE INSULATION

(71) Applicant: DOW GLOBAL TECHNOLOGIES LLC, Midland, MI (US)

(72) Inventors: Mikhail Y. Gelfer, Sugarland, TX (US); Amber Stephenson, Lake Jackson, TX (US); Venkat S. Minnikanti, Delray Beach, FL (US); Mark Brown, II, Richwood, TX (US); Mark R. Whelan, Derbyshire (GB); Arjun A Raghuraman, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 333 days.

(21) Appl. No.: 15/025,173

(22) PCT Filed: Oct. 21, 2014

(86) PCT No.: PCT/US2014/061602
§ 371 (c)(1),
(2) Date: Mar. 25, 2016

(87) PCT Pub. No.: WO2015/065771
PCT Pub. Date: May 7, 2015

(65) Prior Publication Data
US 2016/0244586 A1      Aug. 25, 2016

Related U.S. Application Data

(60) Provisional application No. 61/897,355, filed on Oct. 30, 2013.

(51) Int. Cl.
*C08J 9/32* (2006.01)
*C08G 18/48* (2006.01)
(Continued)

(52) U.S. Cl.
CPC ............ *C08J 9/32* (2013.01); *C08G 18/10* (2013.01); *C08G 18/222* (2013.01);
(Continued)

(58) Field of Classification Search
CPC ..... C08J 9/32; C08J 2375/04; C08G 18/4841; C08G 18/4866; C08G 18/6674; C08G 18/10; C08G 18/222; F16L 59/14
See application file for complete search history.

(56) References Cited

U.S. PATENT DOCUMENTS 5,468,432 A   11/1995   Hurley
5,563,232 A   10/1996   Hurley
(Continued)

FOREIGN PATENT DOCUMENTS

CN   103214648 A   7/2013
DE       299120 A   4/1992
(Continued)

*Primary Examiner* — Michael C Miggins (57) ABSTRACT

Syntactic polyurethane elastomers are made using a non-mercury catalyst. The elastomer is made from a reaction mixture containing a polyether polyol, a chain extender, a polyisocyanate and microspheres. The elastomer is characterized morphologically by the presence of small discrete morphological domains 0.1 to 3 μm in diameter, and the substantial absence of discrete morphological domains 5 to 30 μm in diameter. The elastomer adheres well to itself, which makes it very useful as thermal insulation for pipelines and other structures that have a complex geometry.

12 Claims, 4 Drawing Sheets

(51) Int. Cl.
    *C08G 18/66*   (2006.01)
    *C08G 18/10*   (2006.01)
    *C08G 18/22*   (2006.01)
    *F16L 59/14*   (2006.01)

(52) U.S. Cl.
    CPC ..... *C08G 18/4841* (2013.01); *C08G 18/4866* (2013.01); *C08G 18/6674* (2013.01); *F16L 59/14* (2013.01); *C08J 2375/04* (2013.01)

(56)            References Cited

U.S. PATENT DOCUMENTS

| | | |
|---|---|---|
| 5,731,367 A | 3/1998 | Lee |
| 2004/0127672 A1 | 7/2004 | Heinz |
| 2007/0100027 A1 | 5/2007 | Huntemann |
| 2013/0178582 A1 | 7/2013 | Krause |
| 2014/0107291 A1 | 4/2014 | Eisen |

FOREIGN PATENT DOCUMENTS

| | | |
|---|---|---|
| EP | 607834 A | 7/1994 |
| EP | 639614 A | 2/1995 |
| EP | 1375577 A | 1/2004 |
| EP | 1785445 A | 5/2007 |
| EP | 2399946 A | 12/2011 |
| WO | 2001/032791 A | 5/2001 |
| WO | 2012/006264 A | 1/2012 |
| WO | 2012/126934 A | 9/2012 |
| WO | 2013/002974 A | 1/2013 |

FIGURE 1

FIGURE 2
(Comparative)

FIGURE 3
(Comparative)

SYNTACTIC POLYURETHANE ELASTOMERS HAVING DISTINCT MORPHOLOGY FOR USE IN SUBSEA PIPELINE INSULATION

This invention relates to syntactic polyurethane elastomers useful as subsea pipe and architecture insulation.

Subsea pipelines are used globally to deliver petroleum and/or natural gas from subsea wellhead collection facilities at the ocean surface. Cold sea temperatures can cause solid waxes and hydrates to form as the production fluids are pumped to the surface. This problem is ameliorated by applying a thermally-insulating layer to the exterior of the pipe.

Rigid polyurethane foams are widely used as thermal insulation. These are commonly made by reacting a polyisocyanate with a curing agent in the presence of a blowing gas. The blowing gas becomes trapped in cells in the foam. The trapped gas is largely responsible for the thermal insulation properties of the foam. In most applications, the polyurethane insulating foams are rigid materials. However, a highly rigid polyurethane is unsuitable as subsea pipeline insulation, because its mechanical strength is not sufficient to withstand high pressures typically encountered in subsea applications. The foam densifies and can collapse under the pressure of the seawater, and the densified material is a poor thermal insulator. In addition, the material is too brittle to withstand bending the pipeline undergoes during production, installation and use. An elastomeric insulating material is needed.

Therefore, so-called "syntactic" elastomers have been developed for the subsea pipeline applications. The syntactic elastomers contain hollow microspheres embedded in an elastomeric polyurethane matrix. The microspheres are generally made of glass or other hard material that can withstand the high undersea pressures.

The polyurethane matrix is a reaction product of a polyisocyanate, a "polyol" component and a "chain extender". The "polyol" is typically a polyether having 2 to 4 hydroxyl groups and an equivalent weight per hydroxyl group of 1000 to 6000. The "chain extender" is typically a diol having an equivalent weight of up to about 125. 1,4-butanediol is the most commonly used chain extender in these applications. The polyol, chain extender and polyisocyanate are mixed and cured in the presence of the microspheres to form the syntactic foam.

The curing reaction requires a catalyst to obtain reasonable production rates. For decades, the catalyst of choice has been an organomercury type, phenylmercury neodecaonoate. This organomercury catalyst has many benefits. It provides a very useful curing profile. Reaction systems containing this organomercury catalyst react slowly at first and build viscosity gradually for a period of time. This characteristic provides valuable "open time", during which the reaction mixture can be degassed and introduced into the mold or other place where it is to be cured. After this slow initial cure, the polymerization rate accelerates, so curing times are reasonably short.

Polyurethanes made using organomercury catalysts also have very good physical properties.

The organomercury catalysts are coming under regulatory pressure, and there is now a desire to replace them with different catalysts. Although a very wide range of materials is known to catalyze the curing reaction, it has proven to be very difficult to duplicate the performance of the organomercury catalysts. Many catalysts fail to provide the favorable curing profile of organomercury catalysts. Even when the curing profile can be approximated using alternative catalysts, the good physical properties obtained using organomercury catalysts have proven to be difficult to duplicate.

One catalyst that has found use in syntactic polyurethane elastomer applications is a mixture of a zinc carboxylate with a small amount of a zirconium carboxylate. This catalyst provides a curing profile similar to, but not quite beneficial as, the organomercury catalysts. However, a very significant and previously unknown problem has been found when using this catalyst. The applied syntactic elastomer tends to crack. The cracking problem can be quite pronounced when the substrate has a complex exterior geometry such as when the substrate is branched or contains external surface features.

Another problem seen when using non-organomercury catalysts is that the polyurethane does not bond well to itself. This is a very significant shortcoming. It is common to apply the thermal insulation in multiple layers or to apply the thermal insulation to different portions of the substrate at different times. A bondline is formed where the separate layers or sections come into contact. Even when a single layer of polyurethane insulation is applied, bondlines form when the reaction mixture divides into multiple flow fronts as it flows around the part and the separate flow fronts meet. When the polyurethane does not adhere to itself very strongly, cracks appear at the bondlines. This leads to a loss of thermal insulation efficiency and can expose the underlying substrate to the corrosive effects of seawater.

What is needed in the art is a method of making a syntactic polyurethane elastomer, which does not contain a mercury catalyst, which is resistant to cracking and which bonds well to itself.

This invention is in one aspect a cured syntactic polyurethane elastomer in which gas filled microspheres are dispersed in a noncellular polyurethane matrix, which syntactic polyurethane elastomer is a reaction product of at least one polyether polyol having a number average hydroxyl equivalent weight of at least 800, 5 to 50 weight percent of microspheres based on the total weight of the reaction mixture, 1 to 30 parts by weight of a hydroxyl-terminated chain extender per 100 parts by weight of the polyether polyol(s), an aromatic polyisocyanate in amount to provide an isocyanate index of 80 to 130 and a non-mercury catalyst, wherein the reaction mixture is essentially devoid of mercury compounds and the noncellular polyurethane matrix has a phase-segregated morphology characterized by the presence of small discrete morphological domains 0.1 to 3 µm in diameter, and the substantial absence of discrete morphological domains 5 to 30 µm in diameter.

It has been found that the morphology of the noncellular polyurethane matrix closely correlates to the properties of the syntactic polyurethane elastomer. The morphology of the syntactic polyurethane elastomer is similar to those made using conventional mercury catalysts, even though no mercury catalyst is present. Good tensile and elongation properties are seen with this invention, along with good resistance to cracking and good ability to form strong bonds to itself.

The elastomer of the invention is suitable as thermal insulation for a wide variety of substrates. Substrates of interest are parts that require thermal insulation. Subsea pipe and architecture are substrates of particular interest.

An important advantage of this invention is that the syntactic polyurethane elastomer adheres well to itself and to other cured polyurethane elastomers. This is an especially important advantage when multiple sections of the syntactic polyurethane elastomer are applied to a substrate and in contact with each other, and good bonding between the sections is wanted. Thus, in certain embodiments, the invention is a coated substrate having multiple sections of an applied syntactic polyurethane elastomer in which gas filled microspheres are dispersed in a noncellular polyurethane matrix, the multiple sections being in contact with each other at one or more bondlines. Such a coated substrate has:

a) a first section of a first syntactic polyurethane elastomer on at least a portion of the substrate which first section of syntactic polyurethane elastomer is a reaction product of at least one polyether polyol having a number average hydroxyl equivalent weight of at least 800, 5 to 50 weight percent of microspheres based on the total weight of the reaction mixture, 1 to 30 parts by weight of a hydroxyl-terminated chain extender per 100 parts by weight of the polyether polyol(s), an aromatic polyisocyanate in amount to provide an isocyanate index of 80 to 130 and a non-mercury catalyst, wherein the reaction mixture is essentially devoid of organomercury compounds and the noncellular polyurethane matrix of the first syntactic polyurethane elastomer has a phase-segregated morphology characterized by the presence of small discrete morphological domains 0.1 to 3 µm in diameter, and the substantial absence of discrete morphological domains 5 to 30 µm in diameter and b) a second section of a second syntactic polyurethane elastomer on at least a portion of the substrate which second section of syntactic polyurethane elastomer is a reaction product of at least one polyether polyol having a number average hydroxyl equivalent weight of at least 800, 5 to 50 weight percent of microspheres based on the total weight of the reaction mixture, 1 to 30 parts by weight of a hydroxyl-terminated chain extender per 100 parts by weight of the polyether polyol(s), an aromatic polyisocyanate in amount to provide an isocyanate index of 80 to 130 and a non-mercury catalyst, wherein the reaction mixture is essentially devoid of organomercury compounds and the noncellular polyurethane matrix of the second syntactic polyurethane elastomer has a phase segregated morphology characterized by the presence of small discrete morphological domains 0.1 to 3 µm in diameter, and the substantial absence of discrete morphological domains 5 to 30 µm in diameter, wherein said first section contacts said second section to form at least one bondline at which the first section is adhered to said second section.

Figure 1:
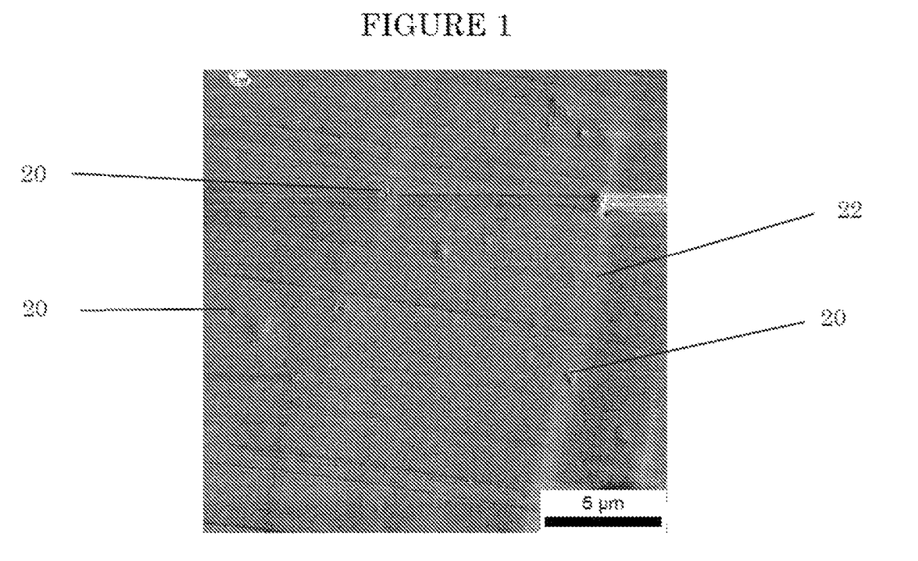
FIG. 1 is a micrograph of a syntactic polyurethane elastomer (Example 1 below) of the invention.

The presence and size of the morphological domains can be determined using microscopic methods such as atomic force microscopy (AFM), which are capable of resolving features in the 100 nm to 100 µm size range. FIG. 1 is a micrograph of a syntactic polyurethane elastomer of the invention (Example 1 as described below). In FIG. 1, discrete morphological domains 20 are seen to have diameters in the range of about 2 µm, and larger discrete morphological domains are seen to be absent in this elastomer. The "diameter" of the discrete morphological domains refers to the longest dimension, as the discrete morphological domains may not be strictly spherical. The discrete morphological domains are dispersed in a continuous phase indicated generally in each of FIGS. 1, 2, 3 and 8 by reference numeral 22. The continuous phase is believed to consist mainly of polyether chains from the polyether polyol starting material.

In some embodiments, dynamic mechanical analysis on the syntactic polyurethane elastomer reveals a tan δ peak centered in the temperature range of 30 to 100° C. having a maximum value of 0.15 to 0.3. This tan δ peak may have a maximum value of 0.175 to 0.25. The tan δ curve for the syntactic polyurethane elastomer preferably includes the following additional features: a local maximum in the range of −100° C. to −30° C., a minimum centered at about −30° C. to about 10° C., a minimum centered above 100° C. and another local maximum at a temperature greater than 150° C.

DMA curves are conveniently obtained on 1-mm thick samples, using a strain-controlled rheometer such as an ARES 2000 rheometer manufactured by TA Instruments at an oscillation frequency of 6.2832 radians/second and a temperature ramp of 3° C. per minute over a temperature range of −100° C. to 200° C.

The presence of this tan δ peak has been found to correlate well to favorable characteristics that closely resemble important properties of conventional syntactic polyurethane elastomers made using mercury catalysts. Among these characteristics are adequate tensile strength and elongation, as well as good resistance to cracking and the ability of the material to bond well to itself.

Figure 4:
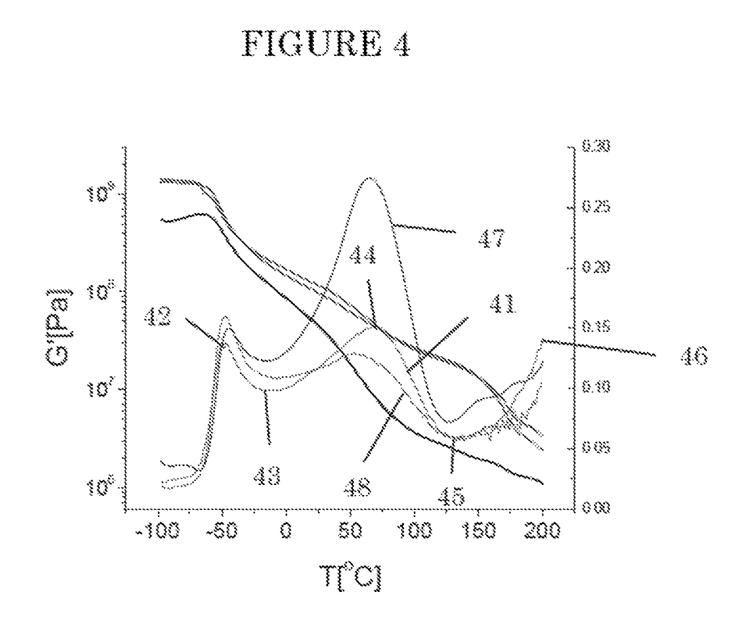
FIG. 4 is a DMA curve of a syntactic polyurethane elastomer of the invention (Ex. 1) and two comparative elastomers (Comp. Samples A and B).

FIG. 4 is an illustrative DMA curve of a syntactic polyurethane elastomer (reference numeral 41) of the invention and two comparative syntactic polyurethane elastomers (reference numerals 47 and 48, respectively). In FIG. 4, peak 44 on tan δ curve 41 represents the characteristic maximum centered in the temperature range of 30 to 100° C. The value of the tan δ curve at the maximum is 0.15 to 0.3, and more typically is 0.175 to 0.25. As shown at reference number 42 in FIG. 4, the tan δ curve typically passes through another local maximum in the range of −100° C. to −30° C., which is believed to represent the glass transition of a rubbery phase corresponding to the polyether polyol used to make the elastomer. The tan δ curve then goes through a minimum centered at about −30° C. to about 10° C. (FIG. 4, reference numeral 43), followed by the pronounced tan δ peak 44 centered at 30 to 100° C. As shown in FIG. 4, this maximum is then followed by another minimum 45 centered above 100° C. Yet another maximum 46 typically appears at temperatures greater than 150° C. This last maximum is believed to correspond to the glass transition of rigid morphological domains.

The polyether polyol(s) used to make the syntactic polyurethane elastomer of the invention are characterized in having a hydroxyl equivalent weight of at least 800. The hydroxyl equivalent weight preferably is at least 1500 and is preferably up to 3000.

The polyether polyol(s) preferably have a nominal functionality of 2 to 6, preferably 2 to 4 and more preferably 2 to 3. The "nominal functionality" of a polyether polyol refers to the average number of alkoxylatable groups per molecule on the initiator compound(s) used to make the polyether polyol. Actual functionalities may be somewhat lower than nominal functionalities in some instances.

The polyether polyol(s) (if more than one is present, collectively) in some embodiments contain no more than 60 µeq/g of terminal unsaturation. A preferred amount is no more than 50 µeq/g of terminal unsaturation. The polyether polyol may contain any lower amount of terminal unsaturation. Terminal unsaturation in a polyether polyol is indicative of the presence of monofunctional polyether species in the product. Therefore lower amounts of terminal unsaturation indicate that the product has a lower quantity of monofunctional polyether species. The monofunctional polyether species are understood to form when the alkylene oxide (especially propylene oxide) isomerizes to form allyl alcohol and/or propenyl alcohol, which are monoalcohols that become alkoxylated to form monofunctional molecules.

Initiators that are useful for producing the polyether polyol(s) include, for example, water, ethylene glycol, diethylene glycol, triethylene glycol, 1,2-propane diol, dipropylene glycol, tripropylene glycol, glycerin, trimethylolpropane, trimethylolethane, pentaerythritol and other aliphatic polyalcohols having a hydroxyl equivalent weight up to about 400. Primary and secondary amines are also useful initiators, but may cause the polyols to be more reactive than desired, so hydroxyl-containing initiators are preferred.

A preferred polyether polyol is prepared by adding propylene oxide and ethylene oxide to a difunctional or trifunctional initiator to produce a polyol having a hydroxyl equivalent weight of 1500 to 2500, especially 1800 to 2200, and containing 5 to 30% by weight polymerized ethylene oxide. The polymerized ethylene oxide may be randomly polymerized with the propylene oxide, may form one or more internal blocks and/or, most preferably, may form terminal blocks that result in primary hydroxyl groups.

An especially preferred type of polyether polyol is made by homopolymerizing propylene oxide or randomly copolymerizing 75-99.9 weight percent propylene oxide and 0.1 to 25 weight percent ethylene oxide onto a trifunctional initiator, and optionally capping the resulting polyether with up to 30% by weight (based on total product weight) ethylene oxide to form a polyether polyol having an equivalent weight of at least 1000 and up to 60, more preferably up to 50, microequivalents of terminal unsaturation per gram of polyol. This polyol preferably has an equivalent weight of 1000 to 3000, especially 1500 to 2500.

For purposes of this invention, a chain extender is one or more compounds having two to three hydroxyl groups and a hydroxyl equivalent weight of up to 125. A preferred type of chain extender is an aliphatic glycol or glycol ether. The aliphatic glycol is a straight-chain or branched alkane having two hydroxyl groups. The glycol ether is a straight-chain or branched aliphatic ether or polyether. The hydroxyl equivalent weight preferably is up to 100 and more preferably up to 75. The hydroxyl groups are preferably on different carbon atoms. The chain extender more preferably is a straight-chain compound in which the carbon atoms are bonded to the terminal carbon atoms. Examples of chain extenders are ethylene glycol, 1,2-propylene glycol, 1,3-propane diol, 1,4-butanediol, 1,6-hexanediol, diethylene glycol, triethylene glycol, dipropylene glycol, tripropylene glycol, glycerin, trimethylol propane, trimethylolethane, or an alkoxylate of any of the foregoing having an equivalent weight of up to 125. Preferred among these are the α,ω-alkylene glycols such as ethylene glycol, 1,3-propanediol, 1,4-butane diol and 1,6-hexane diol. 1,4-butanediol is especially preferred.

A preferred amount of chain extender is 5 to 25 parts by weight for 100 parts by weight of the polyether polyol. A still more preferred amount is 10 to 20 parts by weight on the same basis.

The aromatic polyisocyanate may be, for example, m-phenylene diisocyanate, 2,4- and/or 2,6-toluene diisocyanate (TDI), the various isomers of diphenylmethanediisocyanate (MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane triisocyanate, polymethylene polyphenylisocyanates, hydrogenated polymethylene polyphenylisocyanates, toluene-2,4,6-triisocyanate, and 4,4'-dimethyl diphenylmethane-2,2'5,5'-tetraisocyanate. Preferred polyisocyanates have an average of 1.9 to 2.3 isocyanate groups per molecule, especially from 2 to 2.2 isocyanate groups per molecule and an isocyanate equivalent weight of 125 to 200. The aromatic polyisocyanates may contain uretondione, uretonimine, isocyanurate, biuret, allophonate, carbodiimide, urethane or urea linkages.

Especially preferred polyisocyanates are diphenylmethane diisocyanate (MDI), including the 2,4'-, 2,2'- and 4,4'-isomers or mixtures of two or more of such isomers, "polymeric" MDI products which include a mixture of MDI and one or more polymethylene polyphenylisocyanates, and modified MDI product that contain uretondione, uretonimine, isocyanurate, biuret, allophonate, carbodiimide, urethane or urea linkages and have an isocyanate equivalent weight of 130 to 200.

A preferred isocyanate index is 90 to 125, and a still more preferred isocyanate index is 90 to 115.

The reaction mixture contains at least one catalyst for the reaction of hydroxyl groups with isocyanate groups. The catalyst is a non-mercury catalyst, by which is meant a catalyst that does not contain mercury compounds other than possibly as a trace impurity (constituting no more than 0.1% by weight of the weight of the catalyst). The catalyst (and the amount used) preferably is selected to provide a slow initial reaction for a period of 1 to 10 minutes, followed by an accelerated cure. The catalyst may be a thermally activated type, such as an encapsulated or blocked type.

It has been found that the proper selection of catalyst is one way to obtain a syntactic polyurethane elastomer having the morphology of this invention. The choice of catalyst also affects the shape of the DMA curve, so the selection of catalyst is in addition a way to obtain a syntactic polyurethane elastomer exhibiting a DMA curve as described herein.

A preferred catalyst is a zinc carboxylate catalyst. The zinc carboxylate catalyst is a zinc salt of a carboxylic acid. The carboxylic acid is preferably a monocarboxylic acid having 2 to 24, preferably 2 to 18, more preferably 6 to 18 and especially 8 to 12, carbon atoms. A mixture of carboxylates may be present.

All or a portion of the zinc carboxylate catalyst may engage in a rearrangement to form species which contain Zn—O—Zn linkages. These species are considered as zinc carboxylates for purposes of this invention. The amount of this catalyst may be 0.01 to 1 part, preferably 0.01 to 0.5 part and more preferably 0.01 to 0.2 parts per 100 parts by weight polyether polyol.

The preferred zinc carboxylate catalyst may be used by itself or in combination with one or more other metal carboxylate catalysts. The other metal may be, for example, a group 3-12 metal other than mercury. However, if used with other metal catalyst, the zinc carboxylate preferably constitutes at least 99.5%, more preferably at least 99.9 weight percent of such a mixture.

The reaction mixture is also essentially devoid of mercury compounds, preferably containing no more than 0.01 weight percent mercury, more preferably containing no more than 0.001 weight percent mercury.

The microspheres consist of a shell, which encapsulates either a vacuum or a gas. The shell is approximately spherical. It defines a hollow space, which contains the encapsulated vacuum or gas. The gas may be, for example, air, nitrogen, oxygen, hydrogen, helium, argon, a hydrocarbon or other gas. The shell is capable of withstanding the pressures encountered during the use of the syntactic polyurethane elastomer. The shell may be, for example, glass or other ceramic. The microspheres are generally of the non-expandable type. Non-expandable types are preferred. The microspheres may have a density of, for example, 0.1 to 0.6 g/cc. The particle size preferably is such that at least 90 volume percent of the microspheres have a diameter of 5 to 100 μm, preferably 10 to 60 μm. Glass microspheres are preferred. Suitable microspheres include commercially available products such as 3M™ Microspheres from 3M Corporation and Expancel™ microspheres from Akzo Nobel.

The microspheres constitute 5 to 50 weight percent, preferably 15 to 30 parts weight percent, of the reaction mixture and the resulting syntactic polyurethane elastomer.

Upon curing, the microspheres become embedded in a polyurethane matrix that forms in the curing reaction. Apart from the presence of the microspheres, the polyurethane matrix is preferably non-cellular, as a cellular material becomes easily crushed under high submarine pressures. Accordingly, the reaction mixture preferably has at most very small quantities (such as up to 0.5% by weight in total) of water or other chemical or physical blowing agent. Preferably, physical blowing agents and chemical blowing agents other than water are not added into the reaction mixture. Commercially available polyether polyols often contain small amounts, such as up to 0.25 weight percent, of water, and this water may be carried into the reaction mixture with the polyether polyol(s). Other starting materials may contain similarly small amounts of water. It is preferred, however, not to add water in addition to that (if any) carried in with the raw materials and it is in any case preferred that the reaction mixture contains no more than 0.25 weight percent water, especially no more than 500 parts per million water, based on the entire weight of the reaction mixture.

Moreover, it is preferred to include one or more components that function to help prevent foaming. One such component is a water scavenger, i.e., a material that adsorbs or absorbs water or otherwise ties up any water as may be present and thereby reduce the ability of that water to react with isocyanates during the curing reaction. Zeolites, molecular sieves, fumed silica and other desiccants can be used for this purpose. An anti-foam agent of various types can be used. The anti-foam agent acts to destabilize any gas bubbles as may form in the reaction mixture and cause them to collapse. Water scavengers and anti-foam agents are typically used in small amounts, such as 0.1 to 5 parts by weight per 100 parts by weight of the polyether polyol.

The reaction mixture may contain one or more isocyanate-reactive materials in addition to the chain extender and the polyether polyol described above. However, such isocyanate-reactive materials, if used at all, are preferably used in small amounts, such as up to 5 parts by weight total per 100 parts by weight of the polyether polyol and more preferably up to 2 parts or up to 0.5 parts by weight total per 100 parts by weight of the polyether polyol. Examples of additional isocyanate-reactive materials of this type are polyester polyols, polyether polyols having equivalent weights of less than 1000, crosslinkers (compounds having 3 or more hydroxyl groups or 1 or more primary or secondary amino groups and an equivalent weight of up to 250), and the like.

Other optional ingredients include epoxy resins, particulate fillers (in addition to the microspheres), fibers, reinforcing agents, colorants, biocides, preservatives and antioxidants. Fillers, fibers and reinforcing agents may be used in weights up to 200 parts per 100 parts by weight polyether polyol, but preferably are used in small quantities, such as up to 50 parts or up to 20 parts by weight per 100 parts by weight polyether polyol, and may be omitted entirely. Colorants, biocides, preservatives and antioxidants preferably are used in very small quantities, such as up to 5 or up to 2 parts by weight per 100 parts by weight polyether polyol, if used at all.

Another optional ingredient is a ß-diketone compound. The ß-diketone is a compound in which two keto groups are separated by a methylene group, including compounds having the structure:

wherein each R is independently hydrocarbyl or inertly substituted hydrocarbyl. Preferably, each R is independently an alkyl group, which may be linear, branched or cyclic, which may by aryl-substituted or otherwise inertly substituted. More preferably, each R is independently an alkyl group (linear, branched or cyclic) having 1 to 8, especially 1 to 4 carbon atoms.

Examples of ß-diketone compounds are acetylacetone (pentane-2,4-dione), hexane-2,4-dione, heptane-3,5-dione, 2,2,6,6-tetramethyl-3,5-heptanedione, and the like.

The presence of a ß-diketone compound has been found to improve the bond between multiple sections of the syntactic polyurethane elastomer, when such sections are formed sequentially as described below. The bond strength is in some cases increased very substantially when the ß-diketone compound is present. Additionally, when the ß-diketone compound is included in the reaction mixture, the bond line, when visualized microscopically at a magnification of 100×, is often seen to have fewer defects, compared to when the ß-diketone compound is not present in an otherwise identical formulation, to the point that no defects are visible under such magnification. The bondline in some cases is no longer visible under such magnification. This effect is seen especially when the non-mercury catalyst is a zinc carboxylate catalyst.

The ß-diketone compound may constitute, for example, at least 0.05, at least 0.06, or at least 0.10 to 1% of the combined weight of all components of the reaction mixture except the polyisocyanate(s). In some embodiments, the ß-diketone constitutes up to 0.5% or up to 0.25% of such weight. A preferred amount is 0.06 to 0.5%. A more preferred amount is 0.10 to 0.25% and a still more preferred amount is 0.1 to 0.2%, on the same basis as before.

Alternatively, the amount of the ß-diketone compound can be expressed in terms of the amount of non-mercury catalyst, particularly when the non-mercury catalyst is a metal catalyst. The weight of ß-diketone compound may be, for example, 1 to 10, preferably 1 to 5, more preferably 2 to 5 and still more preferably 3 to 4 times that of the metal non-mercury catalyst(s).

Still another optional ingredient is an epoxy resin, which may constitute, for example 1 to 15, preferably 3 to 10 and more preferably 3 to 7 percent of the combined weight of all ingredients except the polyisocyanate(s). The presence of the epoxy resin has been found to produce smaller hard segment domains, which in turn is believed to have a beneficial effect on the ability of the syntactic polyurethane elastomer to adhere to itself. Epoxy resins include, for example, glycidyl ethers of bisphenols, epoxy novolac resins, epoxy cresol resins, and the like, especially those having an epoxy equivalent weight of up to 500 or up to 250.

A syntactic polyurethane elastomer is formed by mixing the various components and allowing them to cure.

In some embodiments, the components are formulated into a polyol component which contains the polyether polyol and chain extender (and any other isocyanate-reactive species, as may be present) and a separate isocyanate component that contains the polyisocyanate(s). Other ingredients can be formulated into either the polyol or isocyanate component, although it is typical to formulate most or all of these into the polyol component. To make the polyurethane, the polyol component and isocyanate component are mixed at proportions sufficient to provide an isocyanate index as indicated above, and allowed to cure.

In some embodiments, at least a portion of the polyether polyol is reacted with some or all of the polyisocyanate in a first step to form a prepolymer. In a second step, the syntactic polyurethane elastomer is produced by reaction the prepolymer with the chain extender and any remaining polyether polyol in the presence of the microspheres. It has been found that the formation of a prepolymer in a first step favors the development of the desired morphology in the syntactic polyurethane elastomer.

The components can be heated when the polyisocyanate and isocyanate-reactive materials are mixed, or can be mixed at ambient temperature. Preheating can be to 30 to 100° C., for example. The components are generally cured in a mold; the mold can be preheated if desired to a similar temperature. Heat can be applied throughout the curing process if desired, but this is not always necessary or desirable, as the curing reaction is exothermic. Curing is performed until the syntactic polyurethane elastomer has developed enough strength to be demolded without permanent damage or distortion. Once demolded, the syntactic polyurethane elastomer can be post-cured if desired.

The cured syntactic elastomer includes a polyurethane matrix formed in the curing action, in which the microspheres are embedded. The content of microspheres will generally be essentially the same as the content of microspheres in the reaction mixture. As before, the polyurethane matrix preferably is non-cellular apart from the presence of the embedded microspheres.

The invention has particular advantages in applications in which multiple sections of the syntactic polyurethane elastomer are applied to a substrate, such that the successively-applied sections meet and form a bondline. In such embodiments, a first reaction mixture as described herein is applied to the substrate and at least partially cured to form a first section of syntactic polyurethane elastomer. The curing in this step is continued until the polymer has developed enough green strength to be demolded (if in a mold) or otherwise to maintain its shape during subsequent operations. Then, a second reaction mixture as described herein is applied to the substrate and in contact with the first section of syntactic polyurethane elastomer. This forms a bondline between the first section of syntactic polyurethane elastomer and the second reaction mixture. The second reaction mixture is then at least partially cured to form the second section of syntactic polyurethane elastomer adherent to the first section of syntactic polyurethane elastomer. The bond strength at the bondline is preferably at least 5 MPa, more preferably at least 6 MPA and still more preferably at least 8 MPa, as measured by ASTM D638, modified to use a test sample containing the bondline.

The foregoing process can be extended to any number of applied sections.

The individual sections may cover all or only a portion of the substrate. The second and any successive sections may be applied on top of the first section, to form a multilayer syntactic polyurethane coating. Alternatively, the different sections may be applied to adjacent portions of the substrate such that the later-applied section(s) come into contact with one or more earlier-applied section(s) to form a bondline. By "bondline", it is meant the point or points at which the sections are in contact with each other.

Pipelines (including subsea pipelines or land pipelines) and subsea architecture are substrates of particular interest to this invention. Such a substrate can be made of any material that is suitable for its intended use, provided it can withstand the temperatures of the polyurethane-curing process. Polymeric and ceramic materials can be used to make the substrate, and these materials can be reinforced if desired. The preferred materials of construction for pipelines and subsea architecture are metals, especially steel. The substrate may also be coated with a corrosion inhibiting material, including, for example, fusion-bonded epoxy, thermally-sprayed aluminum, a liquid-curable epoxy resin, and the like, prior to being coated with thermal insulation.

Pipe segments may be, for example, 1 to 20 meters in length, and 2 centimeters to 2 meters in diameter. The pipe segments may have diameters of at least 10 centimeters or at least 15 centimeters, and may have diameters up to 1 meter, up to 0.5 meters or up to 0.35 meters. The applied coating of syntactic polyurethane elastomer may be 1 to 25 centimeters thick and is preferably 2.5 to 10.2 centimeters thick. The ends of the pipe segments may be flanged or otherwise adapted (via various fittings, for example) to be joined to an adjacent pipe segment to produce a joint between the adjacent pipe segments.

The pipe or undersea architecture may be linear or have a more complex structure. It may be, for example, branched, curved or have other non-linear configurations. It may have external features that protrude partially or completely through the applied syntactic polyurethane elastomer section(s). Another significant advantage of this invention is that the syntactic polyurethane elastomer section(s) are very resistant to cracking at or near branch points and at or near sites at which protrusions partially or completely through the layer(s). Prior to this invention, this performance has been difficult to achieve without using mercury catalysts.

For pipe and undersea architecture applications, the syntactic polyurethane elastomer may be applied in thicknesses of 2.5 to 20 cm, especially 5 to 12 cm. These thicknesses are usually sufficient to provide the necessary thermal insulation.

The following examples are provided to illustrate the invention and are not intended to limit the scope thereof. All parts and percentages are by weight unless indicated otherwise.

EXAMPLE 1 AND COMPARATIVE SAMPLES A AND B

Polyol A is a nominally trifunctional polyether made by adding propylene oxide and then ethylene oxide to a trifunctional initiator. Polyol A contains about 15% ethylene oxide by weight. It contains mainly primary hydroxyl groups and has a hydroxyl equivalent weight of about 2050. Polyol A contains about 90 µeg/g of terminal unsaturation.

The organomercury catalyst is a commercial grade of phenylmercury neodecanoate.

The Zn catalyst is a zinc carboxylate, which contains some species having Zn—O—Zn linkages. It also contains no more than 0.1 weight percent of other metal carboxylates.

The Zn/Zr catalyst is a mixture of about 99.25% zinc carboxylates and 0.74% zirconium carboxylates. Some of the carboxylate species having M-O-M linkages, wherein M stands for the metal, i.e. either Zn or Zr.

The microspheres are 3M grade S38HS glass microspheres.

Polyisocyanate A is a modified MDI having an isocyanate equivalent weight of 163 and an isocyanate functionality of about 2.1.

Polyurethane Elastomer Example 1 and Comparative Samples A and B are made from the formulations set forth in Table 1.

TABLE 1

| Ingredient (parts by weight) | Comp. A* | Comp. B* | Ex. 1 |
|---|---|---|---|
| Polyol A | 62.4 | 62.6 | 62.6 |
| 1,4-Butanediol | 10.6 | 10.6 | 11.8 |
| Organomercury catalyst | 0.35 | 0 | 0 |
| Zn catalyst | 0 | 0 | 0.03 |
| Zn/Zr catalyst | 0 | 0.03 | 0 |
| Acetylacetone | 0 | 0 | 0.18 |
| Water scavenger | 2.5 | 2.5 | 2.5 |
| Antifoam agent | 0.02 | 0.02 | 0.02 |
| Microspheres | 23.6 | 23.6 | 23.6 |
| Polyisocyanate A | To 104 index | To 104 index | To 104 index |

In each case, a portion of the reaction mixture is cast in a 1-mm press mold at 120° C. under 2000 psi (13,790 kPa) nominal pressure. The material is cured in the mold for 1 hour at that temperature, and cooled overnight in the mold. A sample is taken for atomic force microscopy. A micrograph of Example 1 forms FIG. 1. A micrograph of Comparative Sample A forms FIG. 2. A micrograph of Comparative Sample B forms FIG. 3. Another sample is evaluated by DMA using an ARES 2000 rheometer operated at an oscillation frequency of 6.2832 radians/second, and a temperature ramp of 3° C./minute over the temperature range −10 to 200° C. The DMA curves are shown in FIG. 4.

Figure 2:
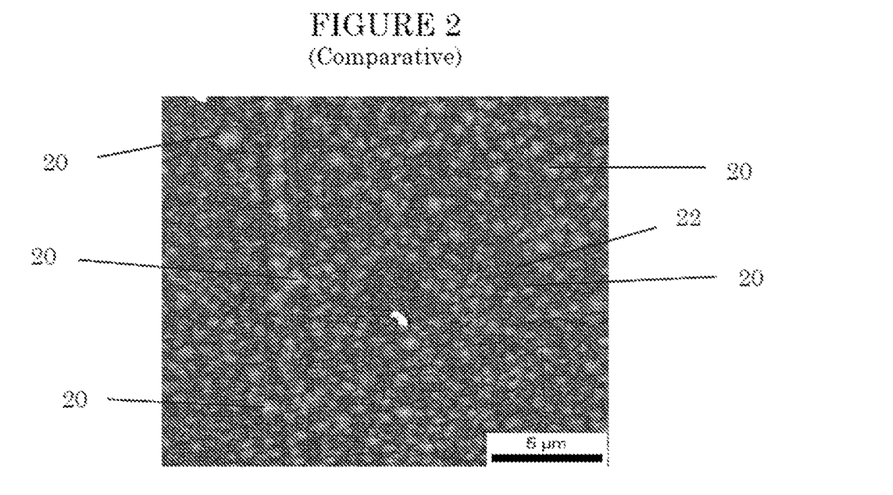
FIG. 2 is a micrograph of a comparative syntactic polyurethane elastomer (Comparative Sample A as described below).

As can be seen in FIG. 1, Example 1 of the invention contains discrete morphological domains 20 that have diameters in the range of about 2 µm. Larger discrete morphological domains are seen to be absent from this elastomer. This morphology is similar to that of the mercury-catalyzed elastomer, as shown in FIG. 2, which also contains small discrete morphological domains 20, in this case being mainly less than 1 µm in diameter. Again, no well-defined large discrete morphological domains are present.

Figure 3:
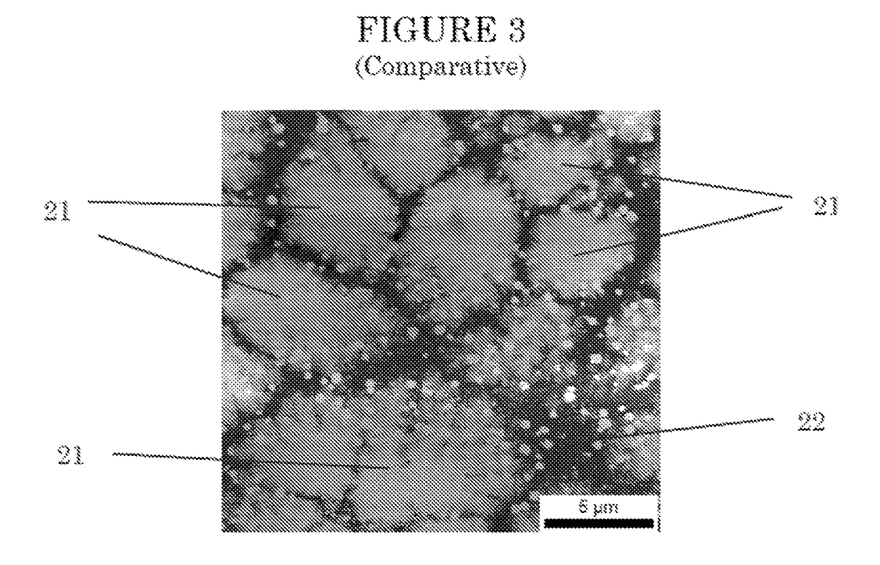
FIG. 3 is a micrograph of a comparative syntactic polyurethane elastomer (Comparative Sample B as described below).

The morphology of Comparative Sample B is quite different, as shown in FIG. 3. In FIG. 3, large morphological domains 21 appear throughout the sample.

The DMA curves for each of these experiments are shown in FIG. 4. As can be seen in FIG. 4, the curves for Example 1 and Comparative Sample A each have a tan δ peak centered in the temperature range of 30 to 100° C. This peak is most pronounced for Comparative Sample A, where the tan δ peak obtains a value of about 0.275. In Example 1, this peak has a maximum value of about 0.15. The peak is much smaller still for Comparative Sample B, where it attains a maximum value of only about 0.125. In each case, the tan δ curve includes a local maximum at around −50° C., a minimum centered at about −25° C., a minimum centered around 120° C. and another local maximum at 150-200° C.

Figure 5:
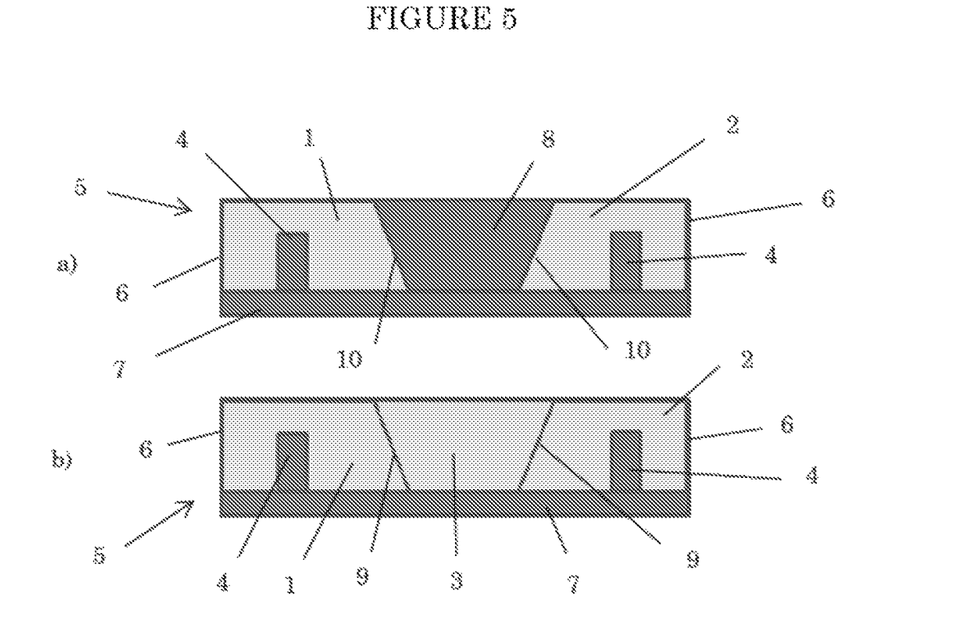
FIG. 5 is a front view, in section, of a mold for making samples for bond strength testing.

Additional syntactic polyurethane elastomers are made from each of these formulations, to test for self-adhesion. The polyol, chain extender, water scavenger and antifoam agent are mixed on a laboratory mixer, followed by the catalyst and microspheres. The polyisocyanate is then mixed in. The resulting reaction mixture is then poured into sections 1 and 2 of the mold illustrated in FIG. 5 and allowed to cure. As shown in FIG. 5, mold 5 includes base 7 and walls 6 which define a mold cavity. The overall mold length is 317 mm. Risers 4 extend upward from base 7 22 mm from each end through the depth (as shown from front-to-rear) of the mold cavity. Risers 4 are 22 mm high and 25 mm wide. Removable insert 8 rests in the mold cavity, dividing the mold cavity into two sections (designated by reference numerals 1 and 2 in FIG. 5 (which are mirror images of each other). Insert 8 has a trapezoidal cross-section, and extends across the entire depth of the mold cavity. The top and bottom surfaces of insert 8 are 153 and 58 mm long, respectively. Walls 10 of insert 8 rise from base 7 at about an angle of 45° from horizontal.

In each case, the reaction mixture poured into sections 1 and 2 is cured isothermally at 120° C. After this curing step, insert 8 is removed from the mold. This leaves two sections of cured elastomer in the mold, one residing in section 1 of the mold cavity and the second residing in section 2 of the mold cavity. The space occupied previously by insert 8 (designated as section 3 in FIG. 5b) is now unfilled. A fresh batch of the reaction mixture is prepared, poured into section 3 and cured as before.

Figure 6:
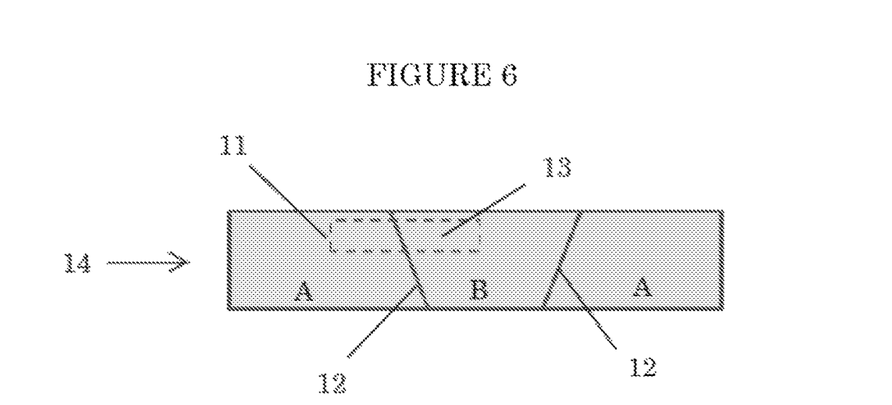
FIG. 6 is a front view of a tripartite elastomer for bond strength testing.

The resulting syntactic polyurethane elastomer in each case consists of three sections, as shown in FIG. 6. Syntactic polyurethane elastomer 14 includes two sections A, which correspond, respectively, to sections 1 and 2 of the mold cavity. Section B corresponds to section 3 of the mold cavity. Bondlines 12 exist at the interface between Section B and each Section A.

Figure 7:
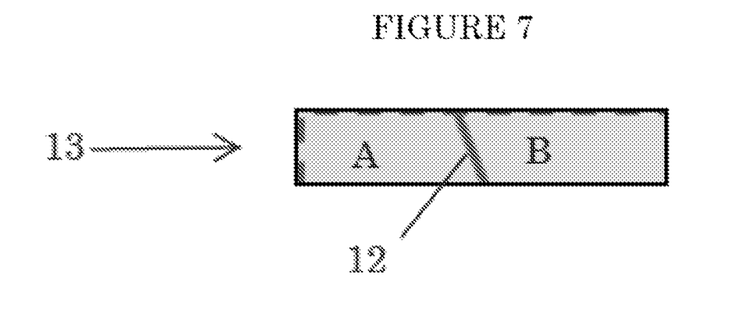
FIG. 7 is a front view of a test sample for bond strength testing.

To test the adhesion of Section B to an adjacent Section A for each of Example 1 and Comparative Samples A and B, test specimen 13 is cut from Elastomer 14 along dotted line 11. As shown in FIG. 7, test specimen 13 includes a portion of Section B and one of Sections A of Elastomer 14, and includes a portion of one of the bondlines 12.

For each of the samples, the strength of bondline 12 is evaluated according to ASTM D638. The ultimate stress at failure is taken as an indication of the bond strength between the adjacent sections of each sample. Results are as indicated in Table 2.

TABLE 2

| Designation | Bond Strength, MPa | Morphology | Tan δ maximum value at 30-100° C. |
|---|---|---|---|
| Comp. A | 9.5 | Small discrete domains, no large ones | 0.275 |
| Comp. B | 3.1 | Large discrete domains | 0.125 |
| Ex. 1 | 6.0 | Small discrete domains, no large ones | 0.150 |

Comparative Sample A represents a traditional system based on a mercury catalyst. The data for Comparative Sample A represents a baseline case. When the mercury catalyst is replaced with a Zr/Zn catalyst (Comparative Sample B), the bond strength is reduced by two-thirds. This is attributed to the large difference in morphology between Comparative Samples A and B, as illustrated in FIGS. 2 and 3. Example 1 shows the effect of using a zinc carboxylate catalyst. Bond strength is much closer to that obtained with the mercury catalyst. This data, together with the microscopy, establish a correlation between polymer morphology and the ability of the elastomer to bond well to itself. The syntactic polyurethane elastomers that have a morphology characterized by the presence of small discrete morphological domains and the absence of larger discrete morphological domains demonstrate significantly better adhesion in this test. In addition, the maximum value of the tan δ peak between 30 and 100° C. also correlates to the strength of the adhesive bond.

EXAMPLE 2

62.5 g of Polyol A is reacted under nitrogen with 45.5 g Polyisocyanate A until the isocyanate content is reduced to about 8% by weight. Glass microspheres, yellow pigment, catalyst and antifoam are added to the resulting prepolymer in amounts as set forth in Table 3.

TABLE 3

| Ingredient | Parts by weight |
|---|---|
| Prepolymer | 325.6 |
| Zn/Zr Catalyst/Acetylacetone | 0.10/0.4 |
| Antifoam | 0.06 |
| Glass microspheres | 73.2 |
| Pigment | 0.64 |

Figure 8:
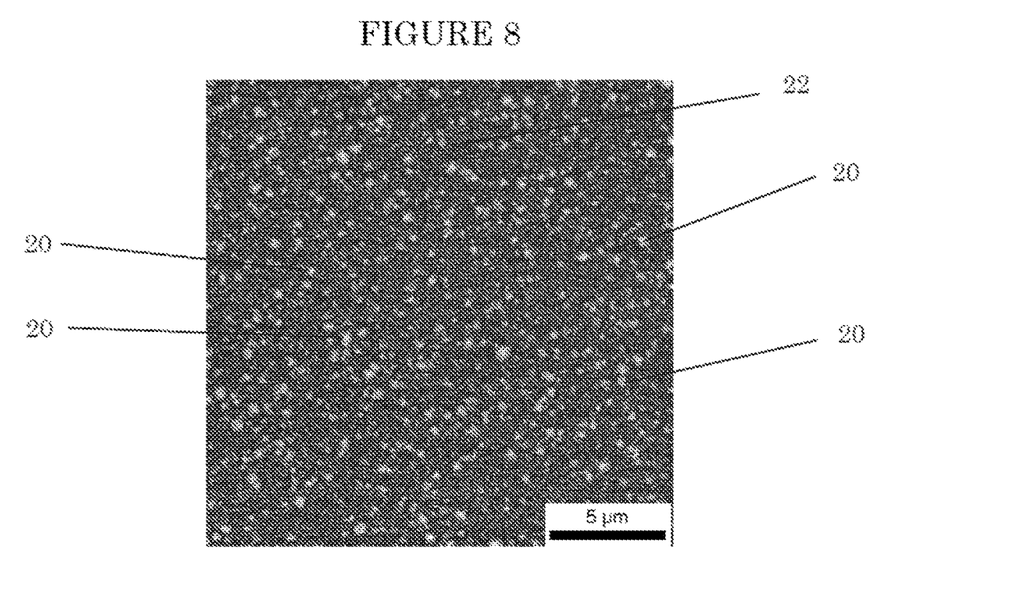
FIG. 8 is a micrograph of a syntactic polyurethane elastomer (Example 2 below) of the invention.

400 parts of the prepolymer mixture is then mixed with 30.9 parts of 1,4-butanediol. A portion of the resulting mixture is case into a mold preheated to 50° C. and cured at that temperature in the mold for 2 hours. A sample is taken to microscopy. A micrograph of the sample forms FIG. 8. As can be seen in FIG. 8, the sample contains small discrete morphological domains 20 but no large ones, similar to those of the mercury-catalyzed elastomer as shown in FIG. 2.

What is claimed is:

1. A cured syntactic polyurethane elastomer in which gas filled microspheres are dispersed in a noncellular polyurethane matrix, wherein the syntactic polyurethane elastomer is a reaction product of at least one polyether polyol having a number average hydroxyl equivalent weight of at least 800, 5 to 50 weight percent of microspheres based on the total weight of the reaction mixture, 1 to 30 parts by weight of a hydroxyl-terminated chain extender per 100 parts by weight of the polyether polyol(s), an aromatic polyisocyanate in amount to provide an isocyanate index of 80 to 130 and a non-mercury catalyst, wherein the reaction mixture is devoid of mercury compounds and the noncellular polyurethane matrix has a morphology characterized by the presence of small discrete morphological domains 0.1 to 3 μm in diameter, and the absence of discrete morphological domains 5 to 30 μm in diameter.

2. The cured syntactic polyurethane elastomer of claim 1 which exhibits on dynamic mechanical analysis a tan δ peak having a maximum value of 0.15 to 0.3 centered in the temperature range of 30 to 100° C.

3. The cured syntactic polyurethane elastomer of claim 2, wherein the tan δ curve for the syntactic polyurethane matrix includes a local maximum in the range of −100° C. to −30° C., a minimum centered at about −30° C. to about 10° C., a minimum centered above 100° C. and another local maximum at a temperature greater than 150° C.

4. The cured syntactic polyurethane elastomer of claim 3 wherein the non-mercury catalyst is a zinc carboxylate or a mixture of a zinc carboxylate and another metal catalyst of which mixture the zinc carboxylate constitutes at least 99.9 weight percent.

5. A cured syntactic polyurethane elastomer in which gas filled microspheres are dispersed in a noncellular polyurethane matrix, which syntactic polyurethane elastomer is a reaction product of at least one polyether polyol having a number average hydroxyl equivalent weight of at least 800, 5 to 50 weight percent of microspheres based on the total weight of the reaction mixture, 1 to 30 parts by weight of a hydroxyl-terminated chain extender per 100 parts by weight of the polyether polyol(s), an aromatic polyisocyanate in amount to provide an isocyanate index of 80 to 130 and catalytic amount of a zinc carboxylate or a mixture of a zinc carboxylate and another metal catalyst of which mixture the zinc carboxylate constitutes at least 99.9 weight percent, wherein the reaction mixture is devoid of mercury compounds.

6. A coated substrate having multiple sections of an applied syntactic polyurethane elastomer in which gas filled microspheres are dispersed in a noncellular polyurethane matrix, the multiple sections being in contact with each other at one or more bondlines, comprising
   a) a first section of a first syntactic polyurethane elastomer on at least a portion of the substrate which first section of syntactic polyurethane elastomer is a reaction product of at least one polyether polyol having a number average hydroxyl equivalent weight of at least 800, 5 to 50 weight percent of microspheres based on the total weight of the reaction mixture, 1 to 30 parts by weight of a hydroxyl-terminated chain extender per 100 parts by weight of the polyether polyol(s), an aromatic polyisocyanate in amount to provide an isocyanate index of 80 to 130 and a non-mercury catalyst, wherein the reaction mixture is devoid of mercury compounds and the noncellular polyurethane matrix of the first syntactic polyurethane elastomer has a morphology characterized by the presence of discrete morphological domains 0.1 to 3 μm in diameter, and the absence of discrete morphological domains 5 to 30 μm in diameter and
   b) a second section of a second syntactic polyurethane elastomer on at least a portion of the substrate which second section of syntactic polyurethane elastomer is a reaction product of at least one polyether polyol having a number average hydroxyl equivalent weight of at least 800, 5 to 50 weight percent of microspheres based on the total weight of the reaction mixture, 1 to 30 parts by weight of a hydroxyl-terminated chain extender per 100 parts by weight of the polyether polyol(s), an aromatic polyisocyanate in amount to provide an isocyanate index of 80 to 130 and a non-mercury catalyst, wherein the reaction mixture is devoid of mercury compounds and the noncellular polyurethane matrix of the second syntactic polyurethane elastomer has a morphology characterized by the presence of discrete morphological domains 0.1 to 3 µm in diameter, and the absence of discrete morphological domains 5 to 30 µm in diameter,
wherein said first section contacts said second section to form at least one bondline at which the first section is adhered to said second section.

7. The substrate of claim 6 wherein each of the first and second sections of syntactic polyurethane elastomer exhibits on dynamic mechanical analysis a tan δ peak having a maximum value of 0.15 to 0.3 centered in the temperature range of 30 to 100° C.

8. The substrate of claim 7, wherein the tan δ curve for each of the first and second sections of syntactic polyurethane elastomer includes a local maximum in the range of −100° C. to −30° C., a minimum centered at about −30° C. to about 10° C., a minimum centered above 100° C. and another local maximum at a temperature greater than 150° C.

9. The substrate of claim 8 wherein the non-mercury catalyst is a zinc carboxylate or a mixture of metal carboxylates of which mixture zinc carboxylates constitute at least 99.9% weight percent of the catalyst.

10. The substrate of claim 8 wherein the substrate is an undersea pipe or undersea architecture.

11. The substrate of claim 10 wherein the undersea pipe or undersea architecture is branched, curved or has another non-linear configuration.

12. The substrate of claim 11 wherein the undersea pipe or undersea architecture has one or more external features that protrude partially or completely through the applied syntactic polyurethane elastomer.

\* \* \* \* \*